United States Patent
Monk

(10) Patent No.: US 7,769,689 B2
(45) Date of Patent: Aug. 3, 2010

(54) METHODS AND SYSTEMS FOR PROCESSING TRANSACTIONS FOR INTEGRATED CREDIT AND STORED-VALUE PROGRAMS

(75) Inventor: Justin Monk, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 107 days.

(21) Appl. No.: 10/694,925

(22) Filed: Oct. 27, 2003

(65) Prior Publication Data

US 2005/0091116 A1 Apr. 28, 2005

(51) Int. Cl.
*G06Q 40/00* (2006.01)

(52) U.S. Cl. .............................. 705/41; 705/39; 705/40; 705/44; 235/379; 235/380

(58) Field of Classification Search .................... 705/17
See application file for complete search history.

(56) References Cited

U.S. PATENT DOCUMENTS

| | | | | |
|---|---|---|---|---|
| 3,935,361 | A | * | 1/1976 | Dorfman et al. ............. 428/189 |
| 5,297,026 | A |   | 3/1994 | Hoffman |
| 5,649,118 | A | * | 7/1997 | Carlisle et al. ................. 705/41 |
| 5,744,787 | A | * | 4/1998 | Teicher ........................ 235/380 |
| 5,764,789 | A |   | 6/1998 | Pare et al. |
| 5,787,404 | A |   | 7/1998 | Fernandez-Holmann |
| 5,796,832 | A | * | 8/1998 | Kawan ........................ 705/65 |
| 5,805,719 | A |   | 9/1998 | Pare et al. |
| 5,839,117 | A | * | 11/1998 | Cameron et al. ............... 705/27 |
| 5,864,830 | A |   | 1/1999 | Armetta et al. |
| 5,930,764 | A | * | 7/1999 | Melchione et al. ............ 705/10 |
| 5,991,736 | A |   | 11/1999 | Ferguson et al. |
| 6,070,153 | A |   | 5/2000 | Simpson |
| 6,076,075 | A |   | 6/2000 | Teicher |
| 6,138,239 | A | * | 10/2000 | Veil ............................ 713/200 |
| 6,185,545 | B1 | * | 2/2001 | Resnick et al. ................. 705/40 |
| 6,289,324 | B1 | * | 9/2001 | Kawan ........................ 705/41 |
| 6,298,336 | B1 | * | 10/2001 | Davis et al. ................... 705/41 |
| 6,330,978 | B1 |   | 12/2001 | Molano et al. |
| 6,580,440 | B1 | * | 6/2003 | Wagner et al. ............... 715/762 |
| 6,598,024 | B1 | * | 7/2003 | Walker et al. ................. 705/16 |

(Continued)

OTHER PUBLICATIONS

Centura webpage, "Fly Free with Travelsmart," found on the internet at http://web.archive.org/web/19980211083417/www.centura.com/cashcards/travelsmart.html, 1 page.

*Primary Examiner*—M. Thein
(74) *Attorney, Agent, or Firm*—Townsend and Townsend and Crew LLP

(57) ABSTRACT

Methods and systems enable a transaction to be processed with a customer at a point of sale with a combined stored-value and credit instrument. A cost for the transaction is received at a point-of-sale device. In addition, instrument-identification information is received identifying an instrument associated with a stored-value account and a credit account. The stored-value account and the credit account were linked substantially contemporaneously with issuance of the instrument to the customer. A request is generated to select a distribution of the cost for the transaction among the stored-value and credit accounts for presentation at the point-of-sale device. Instructions are transmitted from the point-of-sale device to apply the cost for the transaction to the stored-value and credit accounts in accordance with a received response to the request.

20 Claims, 6 Drawing Sheets

U.S. PATENT DOCUMENTS

| | | |
|---|---|---|
| 6,631,849 B2 * | 10/2003 | Blossom .................... 235/492 |
| 6,678,664 B1 | 1/2004 | Ganesan |
| 6,941,279 B1 | 9/2005 | Sullivan |
| 2002/0103753 A1 * | 8/2002 | Schimmel ................... 705/39 |
| 2003/0009382 A1 | 1/2003 | D'Arbeloff et al. |
| 2003/0061093 A1 | 3/2003 | Todd |
| 2003/0204457 A1 | 10/2003 | Arias |
| 2004/0138989 A1 | 7/2004 | O'Malley |
| 2004/0260607 A1 | 12/2004 | Robbins et al. |
| 2005/0080692 A1 | 4/2005 | Padam et al. |

* cited by examiner

METHODS AND SYSTEMS FOR PROCESSING TRANSACTIONS FOR INTEGRATED CREDIT AND STORED-VALUE PROGRAMS

CROSS REFERENCE TO RELATED APPLICATIONS

This application is related to concurrently filed, commonly assigned U.S. patent application Ser. No. 10/694,924, entitled "METHODS AND SYSTEMS FOR MANAGING INTEGRATED CREDIT AND STORED-VALUE PROGRAMS," by Justin Monk, the entire disclosure of which is incorporated herein by reference for all purposes.

BACKGROUND OF THE INVENTION

This application relates generally to consumer transactions. More specifically, this application relates to methods and systems for managing integrated credit and stored-value programs.

In the field of consumer transactions, there has been a steady increase in the versatility with which consumers may provide payment. Offering such versatility has been driven largely by competitive forces so that consumers may be provided with options that best meet their own particular financial circumstances and buying habits. For example, one of the most common and well-known mechanisms for providing payment is a credit-based system in which a consumer is issued a credit card that may be presented at the time of entering transactions. The credit card identifies a credit account that usually has certain borrowing criteria associated with it, particularly a credit limit that has been determined in accordance with such factors as the customer's credit history, income, and other financial factors.

Another type of transaction option that has more recently been increasing in popularity provides funds on a prepaid basis rather than on a credit basis. One example of this type of option is manifested with stored-value accounts in which the account is provided with funds that may later be accessed to support a transaction. Often, one of the convenient aspects of stored-value accounts is that they may be funded by a party different from the customer who later accesses the funds, enabling them conveniently to be provided as gifts. This gift aspect of such accounts is also evident in certain restrictions that may be placed on the use of stored-value accounts, such as by limiting the funds to being used at a particular merchant or collective of merchants.

While the number and variety of transaction options provides consumers with a wide range of choices to meet their individual needs, one drawback has been some difficulty in effectively managing the diverse array of options. There is accordingly a general need in the art for convenient and effective integration of different transaction instruments such as credit and stored-value instruments.

BRIEF SUMMARY OF THE INVENTION

Embodiments of the invention thus provide methods and systems that enable transactions to be processed with a customer at a point of sale with combined stored-value and credit instruments. In a first set of embodiments, a cost for the transaction is received at a point-of-sale device. In addition, instrument-identification information is received identifying an instrument associated with a stored-value account and a credit account. The stored-value account and the credit account were linked substantially contemporaneously with issuance of the instrument to the customer. A request is generated to select a distribution of the cost for the transaction among the stored-value and credit accounts for presentation at the point-of-sale device. Instructions are transmitted from the point-of-sale device to apply the cost for the transaction to the stored-value and credit accounts in accordance with a received response to the request.

In some instances, the request may be for the customer to select one of the stored-value and credit accounts for application of the cost of the transaction. It may be verified that the transaction qualifies for application of the cost to the stored-value account and/or that the transaction qualifies for application of the cost to the credit account. In some instances, the request may identify a current value stored in the stored-value account, in which case, an option may be included to apply an amount of the cost for the transaction in excess of the current value stored in the stored-value account to the credit account.

In another set of embodiments, a cost is also received at a point-of-sale device, as is instrument-identification information identifying an instrument associated with a stored-value account and a credit account. Instructions are transmitted from the point-of-sale device to apply a portion of the cost equal to a current value stored in the stored-value account to the stored-value account and to apply an excess of the cost over the current value stored in the stored-value account to the credit account. The stored-value account and credit account may have been linked substantially contemporaneously with issuance of the instrument. Verifications may be performed to ensure that the transaction qualifies for application of the portion of the cost to the stored-value account and for application of the excess to the credit account.

The methods of the invention may be embodied in a computer-readable storage medium having a computer-readable program for directing operation of a point-of sale device. The point-of-sale device may include an input device, a communications system, and a processor. The computer-readable program includes instructions for operating the point-of-sale device in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide mechanisms for managing integrated credit and stored-value accounts, as well as mechanisms for processing transactions that make use of such integrations. This integration both combines transaction types having very different characteristics resulting from differences between credit and stored-value arrangements, and beneficially exploits those differences. A factor common to many of these embodiments is that a credit account and a stored-value account are both associated with a single instrument that may be used for credit, stored-value, or certain combined transaction forms. The credit and stored-value accounts for each of those instruments may be linked substantially contemporaneously with issuance of the instrument.

Figure 1:
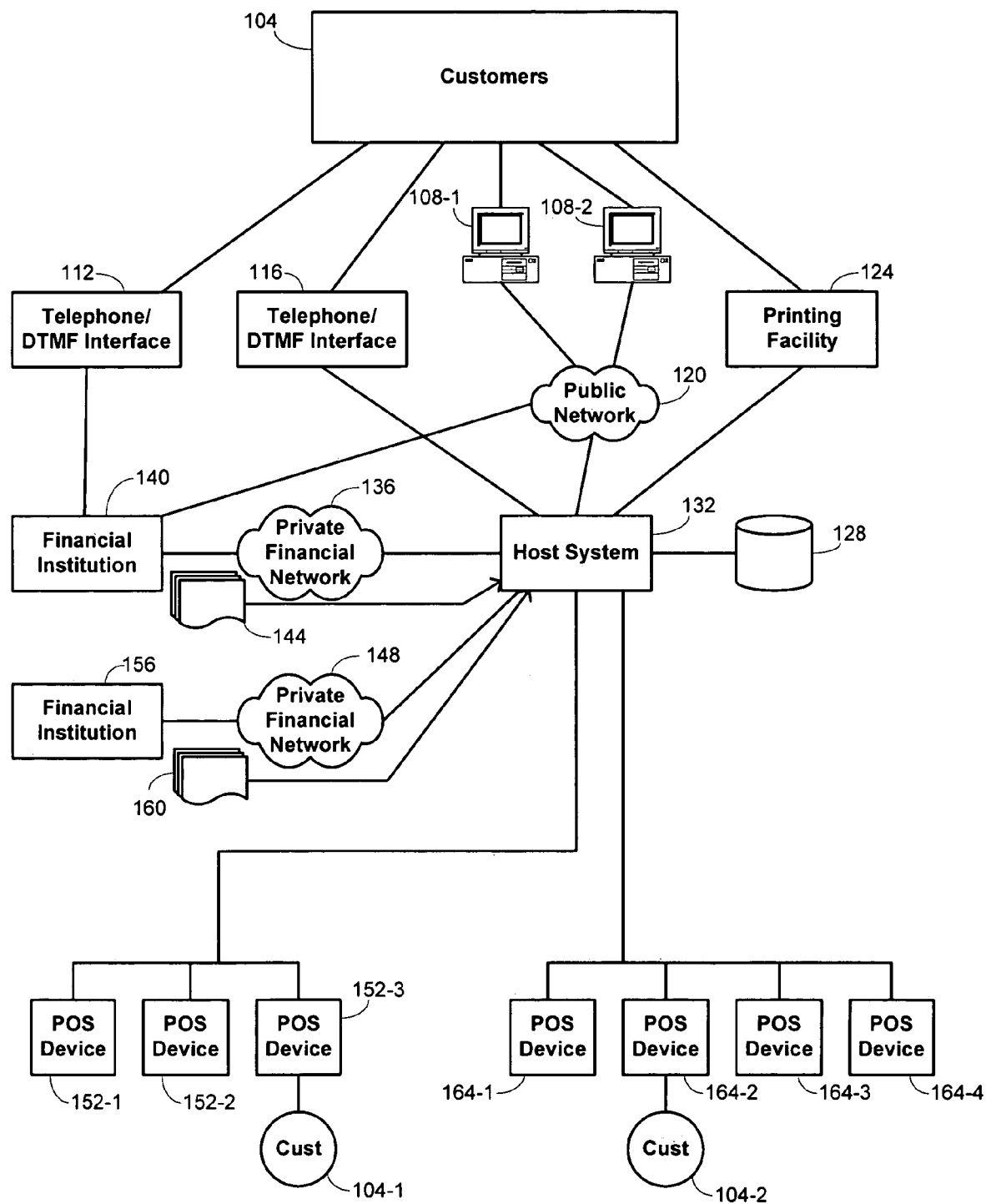
FIG. 1 provides a schematic illustration of an architecture within which methods and systems of the invention may be embodied.

An overview of an architecture in which the methods and systems of the invention may be embodied is provided in FIG. 1. This exemplary architecture is organized about a host system 132 at which the linking of accounts may be performed and which may initiate issuance of instruments associated with the accounts. The host system 132 is provided in communication with a data store 128 that may hold information regarding the accounts, including the linking information and any other information used in administering the accounts. For instance, such information may include identifications of customers authorized to use each account, credit limits applicable to the credit accounts, current value stored in the stored-value accounts, restrictions on merchants where the stored-value accounts may be used, and the like. Because this type of information is considered to be sensitive financial information, it may stored in a secured fashion such as by encrypting it and providing other security features.

Some of the financial information maintained by the host system 132 may originate with financial institutions, with communications between the host system 132 and the financial institutions being effected over private financial networks. Two examples of financial institutions are provided in FIG. 1 and designated with reference numerals 140 and 156. These financial institutions may communicate with the host system 132 respectively through financial networks 136 and 148. While this illustrates an embodiment in which different financial networks are used for communications with different financial institutions, in other embodiments some financial networks may be used for communications with multiple financial institutions. The information packets that are transmitted from the financial institutions are denoted 144 and 160, respectively corresponding to information transmitted to the host system 132 from financial institution 140 over financial network 136 and to information transmitted to the host system 132 from financial institution 156 over financial network 148. For example, as described in greater detail below, the information packets 144 and 160 may comprise data that specify how credit and/or stored-value accounts are to be structured, including specification of credit limits and initial stored-value amounts, with which instruments they are to be associated, whom are the owners of the accounts, and the like. The financial networks 136 and 148 may comprise private networks as indicated in FIG. 1 to provide additional security by limiting modes of unauthorized access.

In the embodiment illustrated in FIG. 1, execution of transactions is coordinated by the host system 132 with information that is received directly from point-of-sale device equipped to capture transaction information where it originates. In this illustration, two groups of point-of-sale devices are shown, each of which may correspond to a different merchant or merchant location, for example. Merely by way of illustration, point-of-sale devices 152 might be a set of devices that are managed on behalf of Merchant A while point-of-sale devices 164 are managed on behalf of Merchant B. The point-of-sale devices 152 or 164 are equipped to capture transaction information, such as the total cost for a transaction and information identifying an instrument presented by a customer 104 during a transaction, and to transmit this information back to the host system 132. While FIG. 1 shows an embodiment in which the communications between the point-of-sale devices 152 or 164 and the host system 132 occur directly, such communications might alternatively be routed through one or more intermediate systems. For instance, in the case of large merchants having multiple locations throughout a large geographical coverage area, routers or servers may be used to coordinate information originating from subareas within the geographical coverage area or could be used according to logical divisions within the merchant, i.e. corresponding to different product department types or the like. Also, in some alternative embodiments, information exchanged between the host system 132 and the point-of-sale devices 152 or 164 might sometimes be routed through the financial institution systems 140 or 156, enabling those institutions to maintain a direct record of transaction information involving their accounts.

Thus, customer access with the host system 132 for transactions is generally effected through one of the point-of-sale devices 152 or 164, although provision may additionally be made for interacting with the host system 132 in other ways to accommodate various customer-service and support functions. FIG. 1 provides an example of some such types of interfacing components. For instance, customers 104 may interact with the host system 132 through public network 120 such as the Internet with their own personal computers 108 or other computational units such as laptops, personal digital assistants, and the like. Such public-network access typically provides an interface through which customers 104 may obtain information various types of information or through which they may update their personal information. For instance, a customer 104 may obtain an account balance for an account maintained by the host system 132, may obtain individual transaction information for a specific account, may update his address, and the like. Alternatively, the customer might instead interact through a telephone interface 116 in which the customer 104 may interact directly with a human customer-service representative, who is able to access the same type of information from the host system 132. Usually, such a telephone interface is also equipped with the ability to recognize dual-tone multiple-frequency ("DTMF") tones so that a customer 104 may conveniently used telephone touch tones to navigate through an automated menu-driven system in accessing information. In still other instances, interaction between the host system 132 and customers 104 may take place through transmission of physical documents using a postal system. As one example, such an arrangement may be used for mailing periodic account statements to the customers 104 after they are printed by a printing facility 124. Alternatively, electronic statements may be provided by transmission through the public network 120 without the need for printing.

The infrastructure may also include interfaces that allow similar interactions between the customers 104 and the individual financial institutions. This is illustrated in FIG. 1 for financial institution 140, but could also be provided in similar fashion for financial institution 156. Thus, a connection with financial institution 140 through the public network 120 also allows customers 104 to interact with the financial institution using similar types of interfaces that may be used by the host system 132. Also, a similar telephone and DTMF interface 112 may be provided to support telephone interactions between the customers and financial institution 140.

Figure 2:
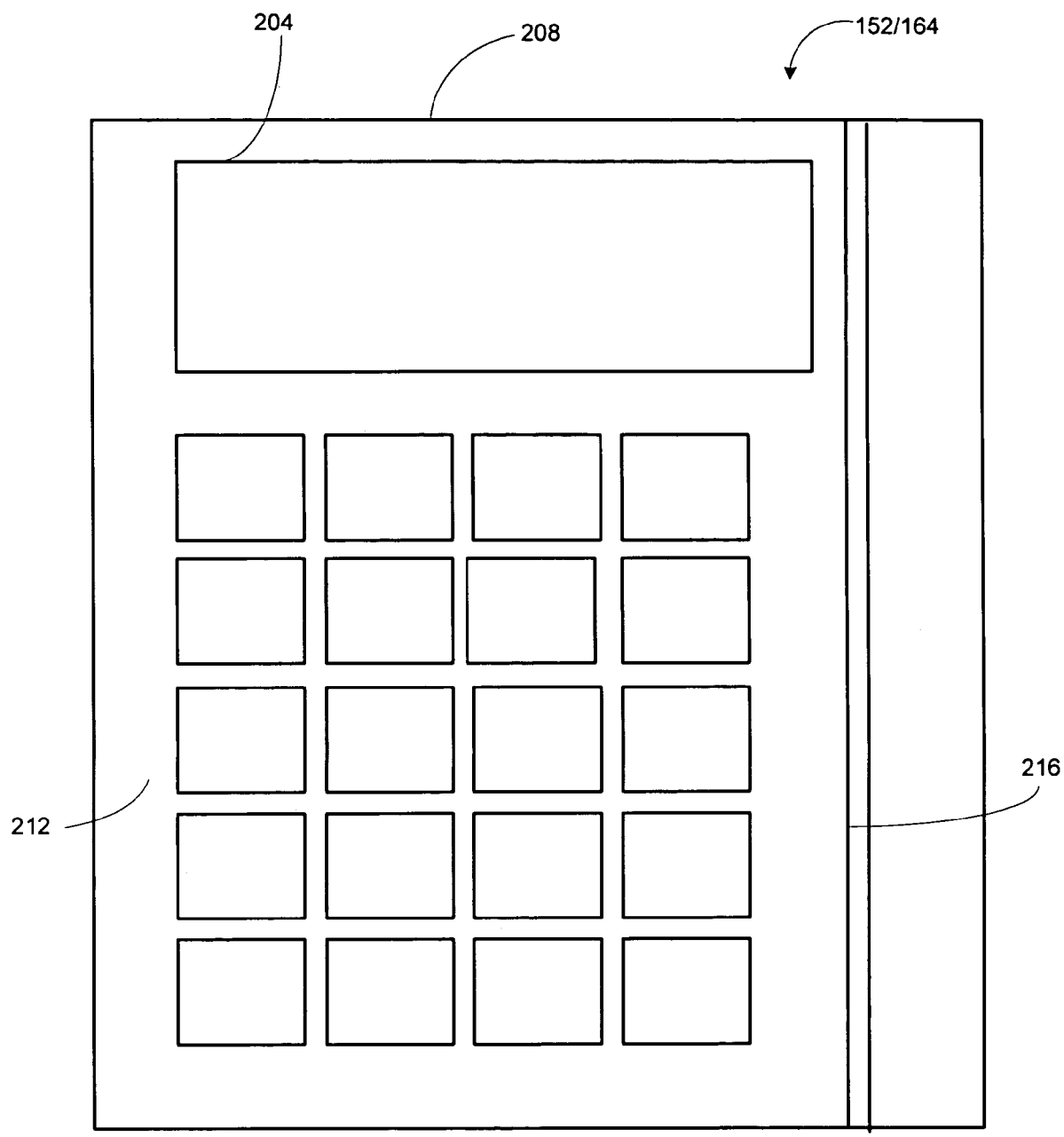
FIG. 2 provides an illustration of a structure for a point-of-sale device that may be used in embodiments of the invention.

A specific example of a point-of-sale device 152 or 164 that may be used in embodiments of the invention, particularly for embodiments where the instrument associated with the linked credit and stored-value accounts comprises a magnetic stripe, is shown in FIG. 2. The point-of-sale device 152 or 164 comprises a housing 208 having a keypad 212 for entering various types of information. The keys of the keypad 212 may permit the entry of numbers or letters, or may be function keys for performing various functions. The point-of-sale device 152 or 164 further includes a display screen 204 for displaying information relating to a transaction. A magnetic-stripe reader 216 may also be provided for reading information from the magnetic stripe affixed to instruments. The point-of-sale device 152 or 164 may communicate with the host system 132 using any of a variety of communications systems, such as by a telephone network, a wide-area network, a local-area network, a wireless network, and the like.

While the structure of the point-of-sale device 152 or 164 shown in FIG. 2 is especially suitable in embodiments where the instrument comprises a plastic card with a magnetic stripe, in alternative embodiments the instrument may comprise other features, such as magnetic ink, a bar code, optical indicia, or the like. Accordingly, in other embodiments, the point-of-sale device 152 or 164 may be equipped for extracting such information from the instrument with magnetic-ink readers, bar-code readers, optical readers, or similar reading devices. Examples of point-of-sale devices that include multiple capabilities for extracting information from such instruments are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

All of these point-of-sale devices are suitable for embodiments where transactions are initiated locally at the location of a merchant, with the point-of-sale device including communications protocols for transmitting the extracted information to the host system 132 and for receiving responses from the host system 132. In other embodiments, the point-of-sale devices make take the form of servers configured for enabling remote transactions. For example, such a server may be provided in communication with the public network 120 shown in FIG. 1 in cases where electronic commerce is supported. In such embodiments, the transaction information is usually collected as part of a web interface, with the customer 104 entering information printed on the instrument for transmission to the server, rather than using the other types of readers described above for local transactions.

Figure 3:
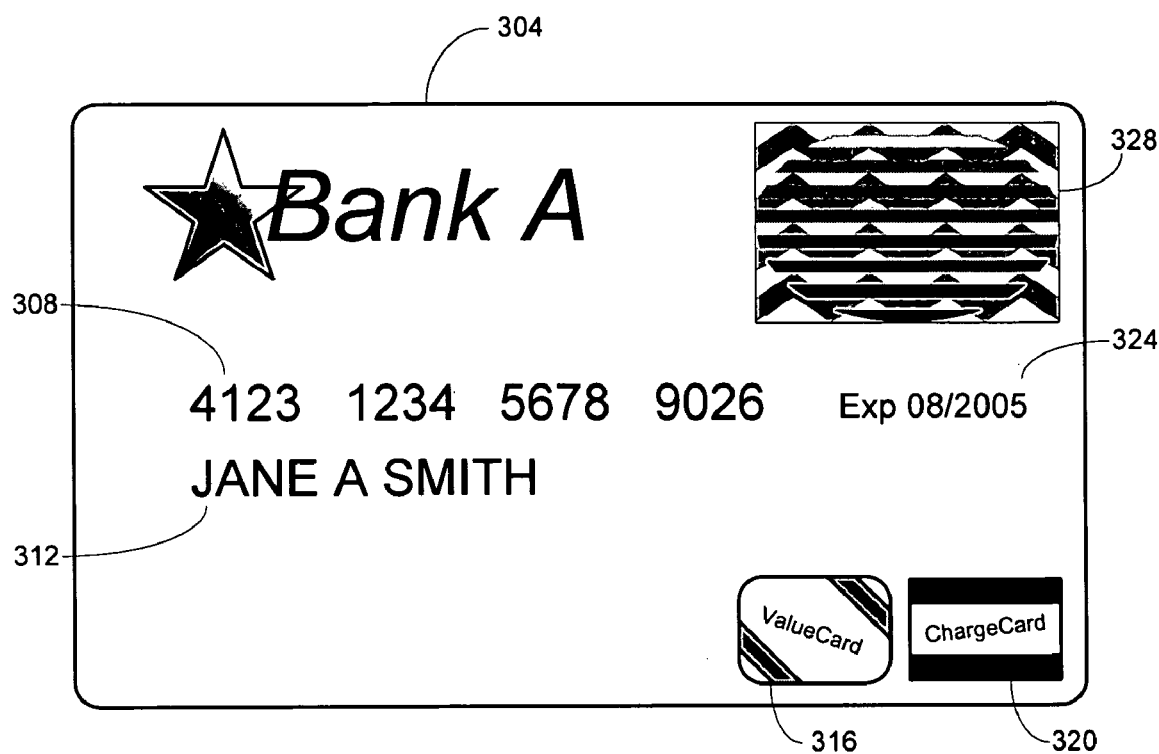
FIG. 3 provides an example of a structure for an instrument that may be used with embodiments of the invention.

Merely for purposes of illustration, FIG. 3 provides an illustration of an instrument in one embodiment that takes the form of a plastic card 304 having a magnetic stripe on its back. In this manner, the physical structure of the instrument is similar to that of dedicated credit or stored-value cards. The card 304 includes a numerical identifier 308, a name 312 for a customer authorized to execute transactions with the accounts identified, and an expiry date 324. All of this information is also encoded magnetically on the magnetic stripe on the back of the card 304, perhaps also with additional information regarding the customer or the linked credit and stored-value accounts that may be accessed. The fact that the card may be used for both credit and for stored-value transactions is indicated on the front of the card with logo 316, which is a recognized identifier for a particular stored-value program, and with logo 320, which is a recognized identifier for a particular credit program. The card may additionally include security features in the form of a physical holographic image 328, in the form of an additional numerical identifying code printed on the back of the card 304, or any of a wide array of other types of security features known to those of skill in the art.

Figure 4A:
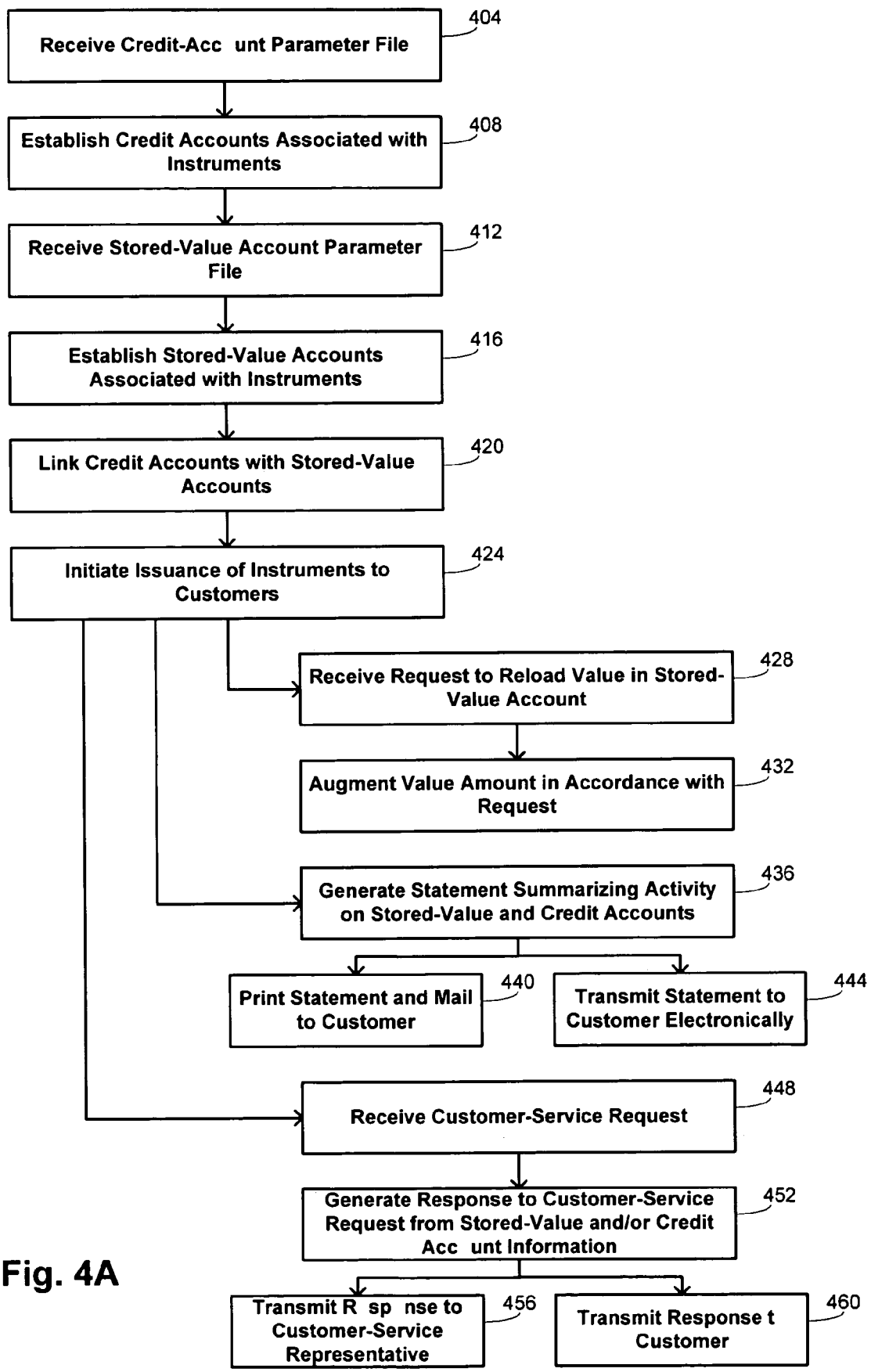
FIGS. 4A and 4B provide flow diagrams detailing illustrative embodiments of the invention.

Once in the hands of the customer, the instrument may be used to manage both credit and stored-value types of transactions. Often, these types of transactions are the ultimate responsibility of different financial institutions 140 or 156, with the only interaction between the otherwise segregated underlying credit and stored-value programs resulting from the mechanisms enabled with the host system. FIG. 4A thus provides an overview of how an instrument may be generated for issuance to a customer to provide such combined functionality, as well as some illustrations of certain functions that maybe implemented with the instrument after issuance. This description is followed with a description in connection with FIG. 4B of how specific transactions are executed using the combination of features provided with the instrument.

Thus, a method for generating combined stored-value and credit instruments-for customers may begin at block 404 of FIG. 4A with a credit-account parameter file being received by a the host system 132. This credit-account parameter file may originate with one of the financial institutions, say institution 140, and usually includes such information as an identity of customers, personal information regarding the customers, the accounts that are to be accessed for credit transactions, the maximum credit limits of such accounts, override criteria, and the like. The host system 132 uses the information supplied by the credit-account parameter file to establish credit accounts associated with certain instruments at block 408. Similarly, a stored-value account parameter file is received by the host system 132 at block 412. This stored-value account parameter file may originate with the same financial institution, i.e. institution 140, but may also originate with a different financial institution such as institution 156. The file includes such information as an identity of customers, the accounts that are to be accessed for stored-value transactions, the initial amounts stored in such accounts, reloading criteria, and the like. The host system 132 uses the information supplied by the stored-value account parameter file to establish stored-value accounts associated with the same instruments as the credit accounts. At block 420, the credit accounts are linked with the stored-value accounts in records maintained on the data store 128, allowing the instruments to be used for either credit or stored-value transactions, or allowing transactions to be executed that invoke both credit and stored-value features.

At block 424, issuance of the instruments to customers is initiated, such as by providing printing and mailing instructions to the printing facility 124. Such initiation is performed substantially contemporaneously with the linking, although the linking may generally be performed before or after initiation of issuance. As used herein, reference to functions being performed "substantially contemporaneously" is intended to be construed within a functional framework, i.e. by referring to functions within a process rather than strictly to a time difference. For example, two functions A and B in a process are considered to be performed substantially contemporaneously if there are relatively few additional functions intervening between them, particularly if any such intervening functions are only minimally or not at all necessary for performing the later performed function A or B. For example, these embodiments of the invention may be contrasted with methods in which issuance of the instrument is dependent on an intermediate function performed after linking credit and stored-value accounts or in which linking of the accounts is dependent on an intermediate function performed after issuing the instrument. Such intermediate functions as receiving a file providing linking information after an instrument has been issued are unnecessary in embodiments of the invention.

After the instruments have been issued to customers, there are a variety of customer-service and maintenance functions that may be performed, some examples of which are illustrated in FIG. 4A. For example, in some instances, a customer may wish to reload value in the stored-value account associated with an instrument. Accordingly, the host system 132 may sometimes receive a request, such as that indicated at block 428, for value to be reloaded. Usually such a request will be supported by separate funds and may be communicated to the host system 132 from one of the point-of-sale devices 152 or 164. For instance, a customer who wishes to reload value may visit a point-of-sale device with cash or some other source of funds, present the instrument, and request that the supporting funds be applied to the stored-value account. The host system responds at block 432 by augmenting its records of the current value in the stored-value account associated with the instrument by the requested amount. In some embodiments, the supporting funds may be provided in the form of credit applied to the linked credit account. In this way, a customer may choose to advance funds on a credit basis to the stored-value account, a feature that may be useful for transactions with merchants who participate in a particular stored-value program but do not participate in the particular credit program.

In other embodiments, value may be reloaded automatically as a benefit to using the credit account. For example, an arrangement may be provided in which use of the credit account by the customer results in loading value to the stored-value account. In some cases, the relative amount of value loaded may depend on where the credit transaction is executed, acting as an incentive for the customer to enter credit transactions at with certain merchants. For instance, merely by way of example, an arrangement could be established where 1% of the amount of any credit transaction using the instrument is automatically loaded into the stored-value account; if the credit transaction is executed at a store of Chain X, an additional 2% of the amount is automatically loaded into the stored-value account.

Another support function that may be performed by the host system 436 is indicated at block 436 in the form of generating a statement that summarizes activity for both the stored-value and credit accounts associated with an instrument. In many embodiments, the generation of such statements may be performed according to a schedule summarizing activity within a particular time period, although in some embodiments the statement generation may be initiated by a request from a customer. Responses to such specific customer requests might be individually tailored to that customer by allowing the specification of date ranges for the transactions, transaction-amount thresholds that are of interests, as well as various ways of grouping summary information according to date, transaction size, and the like. In any event, the statement generated at block 426 advantageously exploits the linking of the stored-value and credit accounts to summarize activity for both types of accounts on a single statement. After generation, each statement may be printed for mailing to a customer 104 by the printing facility 124, as indicated at block 440, or may be transmitted electronically to the customer over the public network 120, as indicated at block 444.

In different embodiments, the execution of a variety of customer-service functions that request information may be performed with or without the assistance of a customer-service representative. These different possibilities accommodate the different habits that are used by different customers and differ primarily in the way in which the requested information is transmitted rather than in how the information is retrieved. Thus, at block 448, a customer-service request is received requesting certain information related to the credit and/or stored-value accounts. This request may originate directly from the customer such as through a web or DTMF interface that allows the customer to specify what type of information is desired, or may originate from a customer-service representative who aids the customer and composes the request. In either case, a response to the request is generated at block 452 from the stored-value and/or credit account information that is maintained on the data store 128. If the request originated from a customer-service representative, the response is transmitted back to that customer-service representative at block 456. If instead the request originated directly from the customer, the response is transmitted back to the customer at block 460 in the form of an electronic response or as a telephone voice response.

Figure 4B:
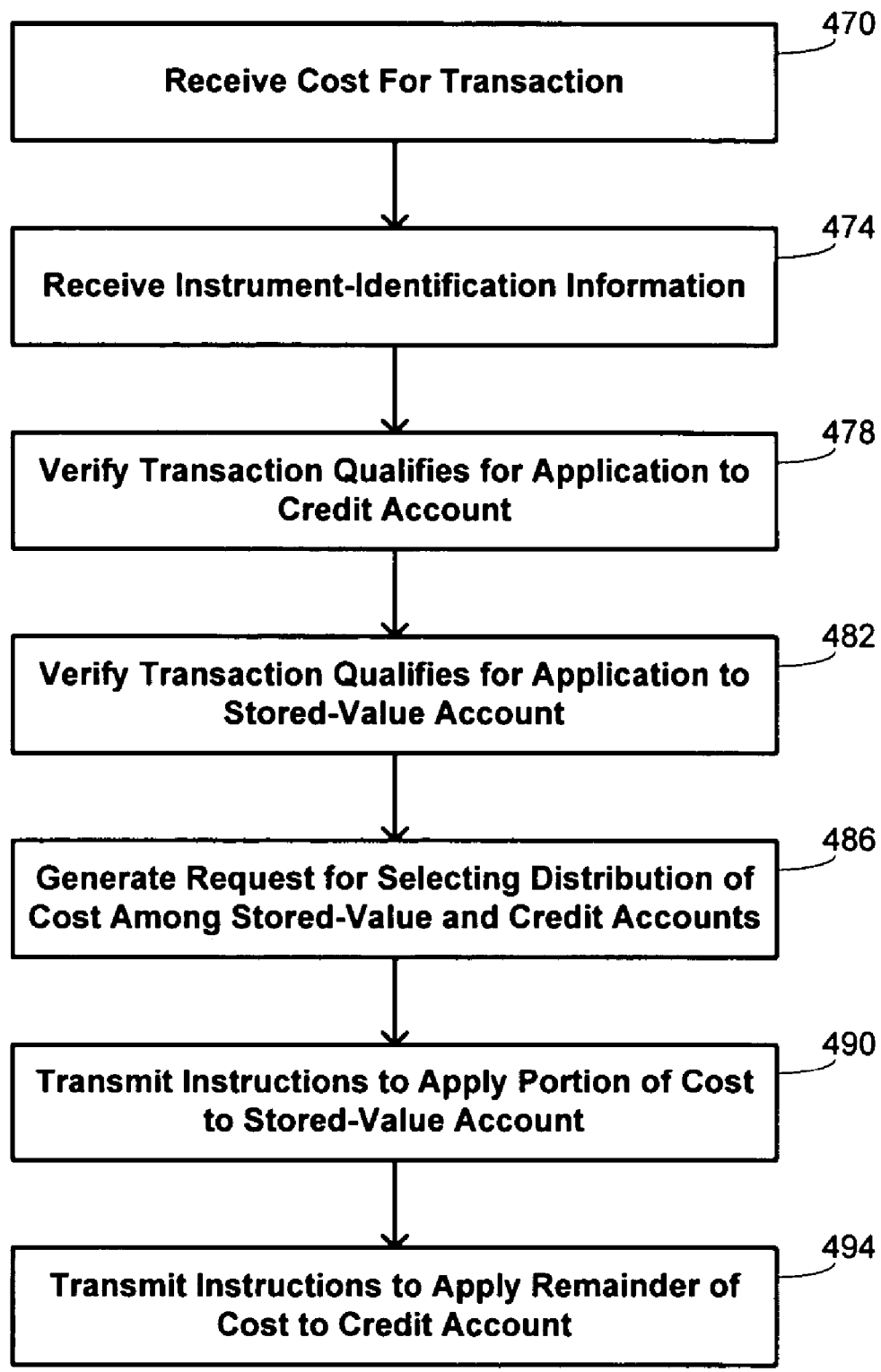

FIG. 4B illustrates a method for executing a transaction using the instrument. Such a transaction typically begins with a customer making a selection of goods and/or services to purchase from a merchant and presenting the selection at a point of sale. The point-of-sale device 152 or 164 is then activated to receive a cost for the transaction at block 470. Receipt of such a cost may, in some instances, be part of a functionality of the point-of-sale device 152 or 164 itself, such as where bar codes affixed to articles are scanned and retrieved costs totaled to produce a total for the transaction. At block 474, the point-of-sale device receives information that identifies the instrument, such as by swiping the magnetic stripe of a card embodiment of the instrument through a magnetic-stripe reader, reading an rf signal, reading a smart card, reading information optically from the instrument, or the like. Identification of the instrument is sufficient to identify the credit and stored-value accounts that were linked substantially contemporaneously with issuance of the instrument.

At block 478, a check is made to ensure that the transaction qualifies for application to the credit account. Such a check may include verifying that the merchant participates in the particular credit program, that the transaction is not for an amount that would cause a credit limit for the credit account to be exceeded, and the like. Similarly, at block 482, a check is made to ensure that the transaction qualifies for application to the stored-value account. Such a check may include verifying that any merchant or merchandise restrictions associated with the stored-value account are met, and the like. The results of these checks may affect the nature of transaction options that are available to the customer.

Thus, as indicated at block 486, the results of these checks are used to generate a request to the customer for selecting a distribution of cost among the stored-value and credit accounts. In some instances, this request may additionally include other options, such as the possibility of paying for a portion of the transaction in cash. The request may be presented on a display of the point-of-sale device 152 or 164, with the customer indicating a response to the request using a keypad or other input component of the point-of-sale device. For instance, suppose the transaction qualifies only for application to the credit account, but not for application to the stored-value account. The request might then ask the customer to indicate how much of the transaction is to be applied to the credit account and how much is to be paid in cash. In cases where the total transaction amount would cause the credit limit to be exceeded, the request might indicate a maximum amount that may be applied to the credit account, requiring the remainder to be paid in cash. Similar options may be presented as part of a request in which the transaction qualifies only for application to the stored-value account and not for application to the credit account. In such an instance, the request might ask how much to apply to the stored-value account and how much to be paid in cash, indicating the maximum amount of the transaction that may be applied to the stored-value account in accordance with the current amount of value stored in the account.

More options may be provided when the transaction qualifies for application to both the stored-value and credit accounts. In such an instance, in addition to requesting a distribution among the two accounts, the request may indicate maximum amounts that may be applied to each of the stored-value and credit accounts. In cases where the combined maxima of those accounts is less than the total transaction amount, payment of the additional amount may be required in cash; if the customer is unable to supply the required cash amount, the transaction might be declined. One example of these types of indications that may arise relatively frequently is where the transaction amount exceeds the amount of value stored in the stored-value account, but is easily within the credit limit of the credit account. This situation may be relatively common because amounts stored in stored-value accounts tend to be relatively small in comparison to credit limits often available in credit accounts. Furthermore, because the stored-value amount is prepaid, it is expected that customers will frequently prefer to use as much of the stored-value amount before applying portions of the transaction cost to a credit account where interest may eventually be charged. The request may therefore offer as an explicit option that all of the value in the stored-value account be applied to the transaction, with any excess amount due being applied to the credit account. Still other distributions may be possible depending on individual circumstances, and may be specified in absolute amounts or as percentage values in different embodiments.

Once the customer has made a selection for the distribution, it is applied by the host system 132 to the accounts. For instance, in the embodiment just described for preferential application to the stored-value account, the point-of-sale device 152 or 164 may transmit instructions at block 490 to the host system 132 to apply a first portion of the cost to the stored-value account, perhaps thereby depleting the stored-value account. At block 494, instructions may be transmitted by the point-of-sale device 152 or 164 to the host system 132 to apply the remainder of the cost to the credit account.

It is noted that while foregoing description has focused on instances where each instrument is associated with a single credit account linked to a single stored-value account, there may be embodiments in which greater numbers of accounts may be linked. In some embodiments, an instrument may be associated with plurality of credit accounts that are linked with one or more stored-value accounts, or an instrument may be associated with a plurality of stored-value accounts that are linked with one or more credit accounts. In these types of embodiments, the nature of the request provided to the customer may reflect the increased variety of options, allowing selection of any qualifying stored-value accounts and/or qualifying credit accounts to be specified by the customer in effecting the transaction.

Figure 5:
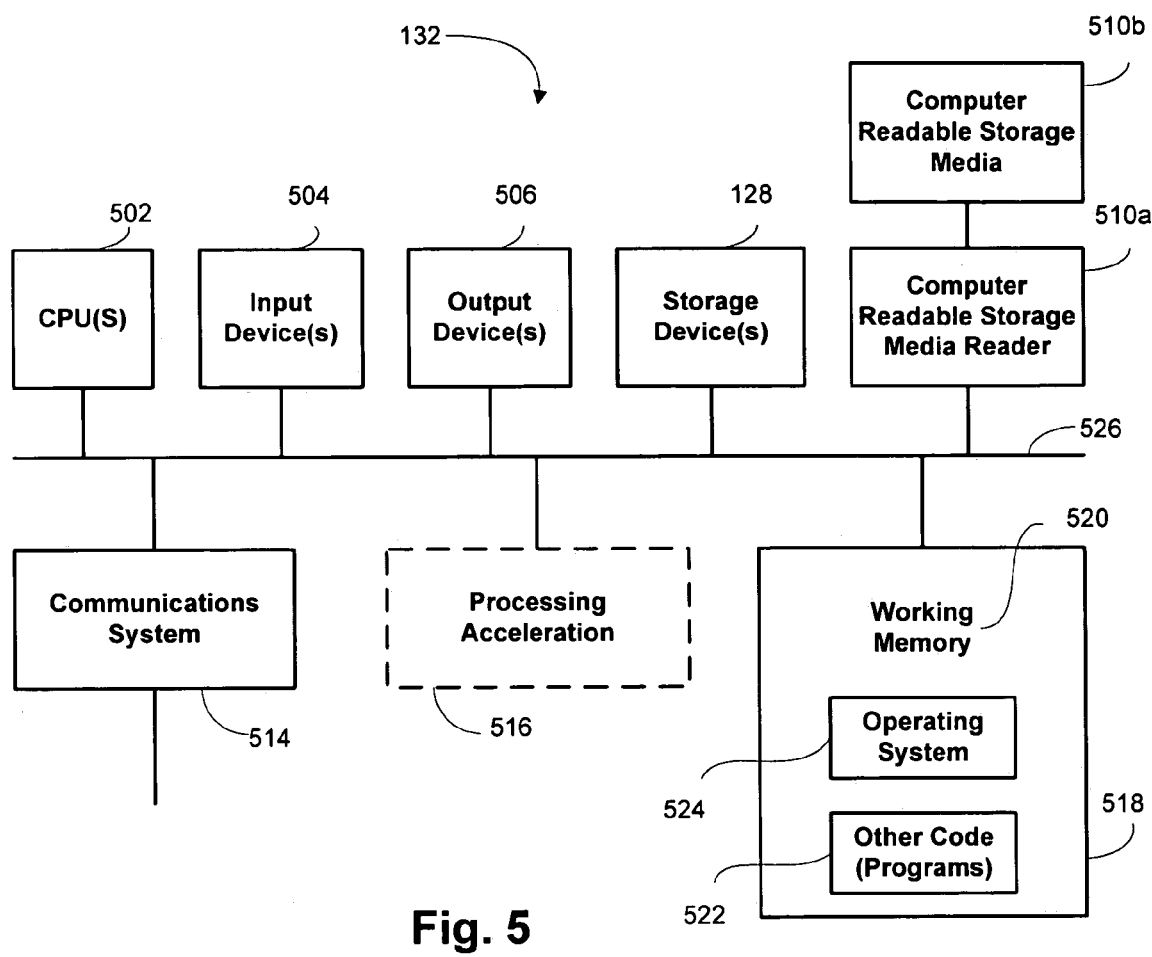
FIG. 5 provides a schematic illustration of a computer system on which methods of the invention may be embodied.

FIG. 5 provides a schematic illustration of a structure that may be used to implement the host system 132. FIG. 5 broadly illustrates how individual system elements may be implemented in a separated or more integrated manner. The host system 132 is shown comprised of hardware elements that are electrically coupled via bus 526, including a processor 502, an input device 504, an output device 506, the data store 128, a computer-readable storage media reader 510a, a communications system 514, a processing acceleration unit 516 such as a DSP or special-purpose processor, and a memory 518. The computer-readable storage media reader 510a is further connected to a computer-readable storage medium 510b, the combination comprehensively representing remote, local, fixed, and/or removable storage devices plus storage media for temporarily and/or more permanently containing computer-readable information. The communications system 514 may comprise a wired, wireless, modem, and/or other type of interfacing connection and permits data to be exchanged with the public network 120, telephone interface 116, and/or point-of-sale devices 152 or 164 or intermediaries as described in connection with FIG. 1.

The host system 132 also comprises software elements, shown as being currently located within working memory 520, including an operating system 524 and other code 522, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In another set of embodiments, the use of a host system may be avoided. For example, the instrument may comprise a chip card (sometimes referred to as a "smart" card) that includes a chip on which information may be stored and retrieved. In such an embodiment, the chip acts as a surrogate for the host system, retaining the necessary credit and stored-value account information. The chip card may be used in much the same way as described above, with the information being extracted and/or modified with a chip-card reader/writer comprised by the point-of-sale device 152 or 164. The operation of the point-of-sale device 152 or 164 is similar to that described previously except that it functions in response to information extracted only from the instrument rather than also in response to information received from the host system.

Thus, while having described several embodiments, the above description should not be taken as limiting the scope of the invention, which is defined in the following claims.

What is claimed is:

1. A method for processing a transaction with a customer at a point of sale, the method comprising:
   receiving, at a point-of-sale device, a cost for the transaction;
   receiving, at the point-of-sale device from an instrument, an instrument identifier identifying the instrument, wherein the instrument identifier is associated with a stored-value account and a credit account, and wherein the stored-value account and the credit account were linked to the instrument identifier at a remote host substantially contemporaneously with issuance of the instrument to the customer;

transmitting, from the point-of-sale device to the remote host, the instrument identifier;

receiving, at the point-of-sale device from the remote host, account information relating to the stored-value account and the credit account linked to the instrument identifier, the account information generated by the remote host based at least in part on the instrument identifier;

generating, based at least in part on the account information, a request to select a distribution of the cost for the transaction among the stored-value and credit accounts;

displaying, at the point of sale device, the request;

receiving, at the point of sale device, a response to the request that identifies a selected distribution identifying a first nonzero portion of the cost for the transaction to be applied to the stored-value account and a second nonzero portion of the cost for the transaction to be applied to the credit account; and transmitting, from the point-of-sale device, instructions to apply the cost for the transaction to the stored-value and credit accounts in accordance with the received response.

2. The method recited in claim 1 wherein generating the request comprises generating a request for the customer to select one of the stored-value or credit accounts for application of the cost for the transaction.

3. The method recited in claim 1 further comprising verifying that the transaction qualifies for application of the cost to the stored-value account.

4. The method recited in claim 1 further comprising verifying that the transaction qualifies for application of the cost to the credit account.

5. The method recited in claim 1 wherein the request identifies a current value stored in the stored-value account.

6. The method recited in claim 5 wherein the request includes an option to apply an amount of the cost for the transaction in excess of the current value stored in the stored-value account to the credit account.

7. The method recited in claim 1 wherein the cost for the transaction exceeds a current value stored in the stored-value account and the instructions include:

a request to apply a portion of the cost equal to the current value stored in the stored-value account to the stored-value account; and a request to apply an excess of the cost over the current value stored in the stored-value account to the credit account.

8. The method of claim 7, wherein the request includes an explicit option that all of the stored-value card value be applied to the transaction and excess be applied to the credit account.

9. The method of claim 1, wherein the request includes a first maximum amount that may be applied to the credit account, the first maximum amount being less than the cost for the transaction.

10. The method of claim 9, further comprising:

modifying, with a writer at the point-of-sale device, the credit account information in the instrument to reflect use of the second nonzero portion.

11. The method of claim 1, wherein the request includes a second maximum amount that may be applied to the stored-value account, the second maximum amount being less than the cost for the transaction.

12. The method of claim 11, further comprising:
extracting the second maximum amount information from the instrument.

13. The method of claim 11, further comprising:
receiving the second maximum amount information from the host system.

14. The method of claim 1, wherein,
the request includes a minimum nonzero amount that is required to be paid in cash; and
the minimum nonzero amount is included in the displayed request.

15. A system for processing a transaction with a customer at a point of sale, the system comprising:

a remote host, configured to store an instrument identifier identifying an instrument associated with a stored-value account and a credit account, wherein the stored-value account and the credit account were linked to the instrument identifier at the remote host; and a point-of-sale device, remote to the host, and configured to:

receive a cost for the transaction;

receive the instrument identifier from the instrument;

transmit the instrument identifier to the remote host;

receive, from the remote host, account information relating to the stored-value account and the credit account linked to the instrument identifier, the account information being generated by the remote host based at least in part on the instrument identifier;

generate, based at least in part on the account information, a request to select a distribution of the cost for the transaction among the stored-value and credit accounts;

display the request;

receive a response to the request that identifies a selected distribution identifying a first nonzero portion of the cost for the transaction to be applied to the stored-value account and a second nonzero portion of the cost for the transaction to be applied to the credit account; and transmit instructions to apply the cost for the transaction to the stored-value and credit accounts in accordance with the received response.

16. The system recited in claim 15, wherein the point-of-sale device is further configured to:
verify that the transaction qualifies for application of the cost to at least one of the stored-value account or the credit account.

17. The system recited in claim 15, wherein the point-of-sale device is further configured to:
identify a current value stored in the stored-value account.

18. The system recited in claim 17, wherein the point-of-sale device is further configured to:
apply an amount of the cost for the transaction in excess of the current value stored in the stored-value account to the credit account.

19. The system recited in claim 15, wherein the point-of-sale device is further configured to:
extract an amount of the cost for the transaction from the instrument.

20. The system recited in claim 15, wherein the point-of-sale device is further configured to:
receive maximum amount information from the remote host relating to a maximum amount that may be applied for the transaction to at least one of the credit account or the stored-value account.

* * * * *